July 12, 1949.  H. KLEMPERER  2,475,621

INVERTER

Filed Sept. 20, 1945

INVENTOR.
HANS KLEMPERER,
BY Elmer J. Gorn
ATTY.

Patented July 12, 1949

2,475,621

UNITED STATES PATENT OFFICE 2,475,621

INVERTER

Hans Klemperer, Belmont, Mass., assignor to Raytheon Manufacturing Company, Newton, Mass., a corporation of Delaware Application September 20, 1945, Serial No. 617,610

10 Claims. (Cl. 175—363)

This invention relates to an electrical system for converting direct current into alternating current.

It is frequently desired to obtain a stabilized alternating voltage of a given frequency from a direct current source of widely varying voltage. For example, where the direct current source is a storage battery, the input voltage may vary considerably depending upon the condition and state of charge of the battery. If the alternating current output must be relatively stable, it has heretofore been necessary to provide a voltage regulator to control the output of the source.

It is among the objects of the present invention to provide a system in which the inverter itself functions to supply a highly stabilized alternating current output without the necessity for interposing voltage regulator units.

It is a further object of the invention to provide a system of the type in which there are no moving parts throughout the power system.

It is a further object to provide a system of the type described in which the power losses are relatively low.

Figure 1:
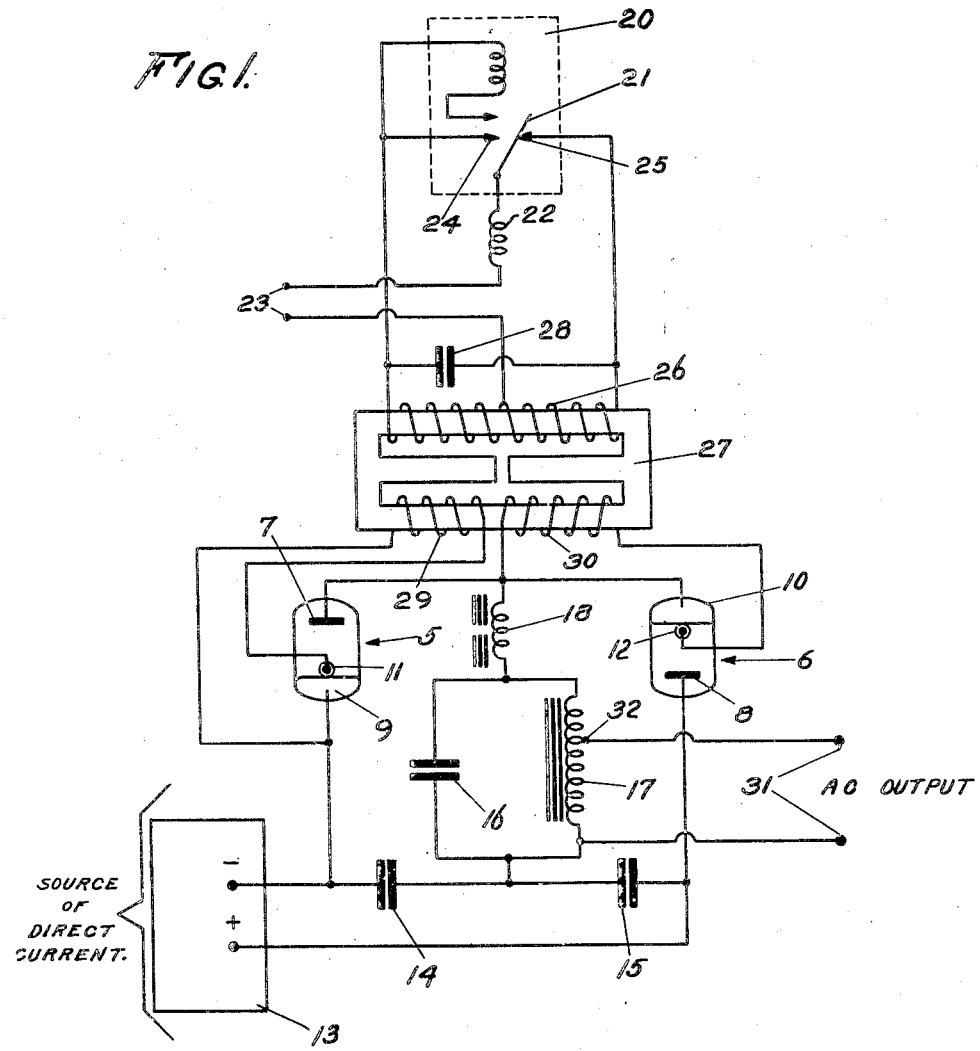
Figure 2:
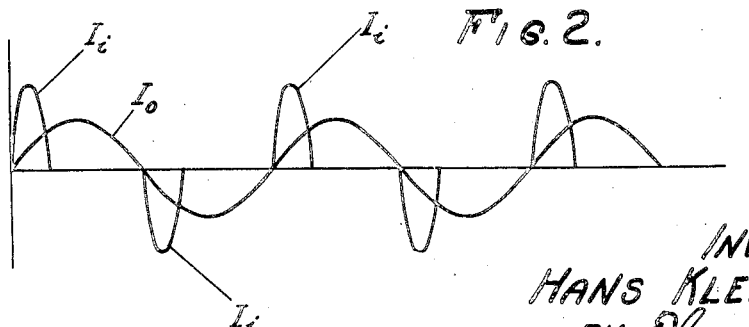

The above and other objects and features of the invention will be made fully apparent to those skilled in the art from a consideration of the following detailed description taken in conjunction with the accompanying drawing in which:

Fig. 1 is a diagrammatic representation of an inverter system embodying my invention; and Fig. 2 is a set of curves useful in illustrating certain operating characteristics of the invention.

Referring to the drawing, the inverter illustrated includes a pair of controlled discharge tubes 5 and 6. These are gas-filled tubes of the controlled type, each having, respectively, anodes 7 and 8, mercury pool type cathodes 9 and 10, and control electrodes 11 and 12. In the instance shown, the control electrodes 11 and 12 are make-alive electrodes of the dielectric type, as described and claimed in U. S. Patent No. 2,257,768 to Percy L. Spencer, patented October 7, 1941, and which are particularly suited to the purposes of the present invention because of their low drain of control power. However, it will be understood that other control elements, such as other types of make-alive electrodes or grids may be utilized. The anode 8 of the tube 6 is connected to the positive terminal of a source of direct current 13. Its cathode 10 is connected to the anode 7 of the tube 5, the cathode 9 of which tube is connected to the negative terminal of the direct current source 13. A pair of condensers 14 and 15 are connected in series across the terminals of the source 13. A circuit, including a condenser 16 and a saturable reactor 17 in parallel together with a linear reactor 18 in series, is connected between a point intermediate the condensers 14 and 15 and a point intermediate the anode 7 of the tube 5 and the cathode 10 of the tube 6.

In order to supply energizing impulses to the control electrodes 11 and 12 of the tubes 5 and 6, I provide an energizing circuit comprising a vibrator 20 having an armature 21 connected through an inductor 22 to one of the terminals of a source of direct current 23, for instance, a six-volt battery. The armature 21 is adapted to vibrate between contacts 24 and 25 connected to the opposite ends of a primary winding 26 of a peaking transformer 27. A center tap on the primary winding 26 is connected to the other terminal of the direct current source 23. Preferably, a condenser 28 is connected across the primary winding 26 of the peaking transformer 27. A pair of secondary windings 29 and 30 are provided on the peaking transformer 27, one terminal of the secondary winding 29 being connected to the control electrode 11 of the tube 5, and the other terminal of this winding being connected to the cathode 9 of the tube 5. The other secondary winding 30 of the peaking transformer 27 similarly has one terminal connected to the control electrode 12 of the tube 6 and its other terminal connected to the cathode 10 of said tube. The stabilized alternating-current output may be led off from terminals 31, one of which is connected to the lower end of the saturable inductor 17, and the other terminal of which is connected to a tap 32 at an adjustable point intermediate the length of the inductor 17.

When the system described in the foregoing is energized, the condensers 14 and 15 are each charged to a voltage which is approximately half the voltage of the direct-current source 13. When the vibrator circuit is closed, an energizing impulse is supplied to one or the other of the control electrodes 11 and 12 of the tubes 5 and 6. Assuming that the energizing impulse is supplied by the secondary winding 29 of the peaking transformer 27 to the control electrode 11 of the tube 5, the condensers 14 and 15 change their charge through the parallel circuit, including the condenser 16 and inductor 17, the inductor 18 and the tube 5. The discharge circuit of the condenser 14 may not be highly damped, and therefore its discharge current may tend to be oscillatory. In such case, when the condenser 14 loses charge through the tube 5, its voltage is reversed. The magnitude of the reversed voltage is determined by the degree to which energy is absorbed in the output circuit. Since the voltage which is impressed on the condenser 15 is the sum of the voltage of the direct-current source and the voltage of the condenser 14, it will be seen that upon the discharge of the condenser 14 the condenser 15 is charged to a higher potential than that of the direct current source.

During discharge of the condenser 14 and the further charging of the condenser 15 in the manner described, the condenser 16 is charged in such a direction that its lower end becomes positive and its upper end negative. An inverse voltage is thus applied to the tube 5 due to the reversal of the charge on condenser 14 and also due to the direction of the charge on the condenser 16. The tube 5 goes out. The condenser 16 discharges through the inductor 17 which becomes saturated. At a time when the charge on the condenser 16 has reversed so that its upper end is positive and its lower end is negative, an energizing impulse is supplied to the ignitor 12 of the tube 6. This tube fires to discharge the condenser 15 through the oscillatory circuit, comprising the condenser 16 and the inductor 17 in the reverse direction to the discharge of condenser 14, and thus recharges condenser 14 in its original polarity. The charge on the condenser 15 is applied across the inductor 17 in the same direction as the charge on the condenser 16. A voltage is thus applied across the terminals of the inductor 17, a portion of which voltage is applied across the terminals 31 of the alternating-current output circuit. After the saturation of the inductor 17, the direction of the charge on the condenser 16 is again reversed, the lower side thereof again being positive, and the condenser 14 is again charged in the original polarity. The potential across the output terminals 31 is now reversed, the tube 5 is again discharged, and the cycle is repeated.

The circuit described in the foregoing provides a system in which a highly stabilized alternating current output is obtained from a variable direct current source even though the voltage of the source may vary over wide limits. This effect is obtained in the following manner.

As previously stated, the voltage on the condensers 14 and 15 derived directly from the source 13 is one-half of the voltage of said source. However, upon the discharge of one of the condensers, the charge on the other condenser is increased. The voltage across the output terminals 31 is directly proportional to the voltage across the oscillatory circuit 16—17. It will be seen that without the inductor 18, upon the firing of one of the tubes 5, the full voltage of the corresponding condenser 14, except for the small voltage drop across the tube 5, will be applied across the oscillatory circuit 16—17. Accordingly, the voltage across the output terminals 31 would vary directly with variations in the voltage of the source 13.

With a non-saturable inductor 18 in the discharge circuit of the condensers 14 and 15, upon the firing of one of the tubes, say 5, the full voltage of the corresponding condenser 14 does not immediately appear across the oscillatory circuit 16—17 due to the impedance of the inductor 18. On the contrary, the voltage rises gradually in a more or less sine-like wave. If the inductor 17 were non-saturable, the voltage across the inductor 17 would nevertheless vary with variations in the voltage on the condenser 14. However, since the inductor 17 is saturable, once the current through it has passed the saturation value, the voltage thereafter does not build up on the condenser 16 except to the degree permitted by the losses within this inductor. Since these losses are low, the voltage drop across it rises only gradually with increases in current. It will thus be seen that, in the construction of this invention, any tendency of the voltage across the condenser 14 to increase will be counteracted by the parallel condenser 16. The output voltage is therefore highly stabilized regardless of variations in the voltage of the source 13.

It will be understood that the frequency of the oscillatory circuit 16—17 is not critical, that is to say, the natural frequency of the oscillatory circuit 16—17 may vary over a considerable range of frequencies in the region of the frequency of the vibrator 20. Since the oscillations of the oscillatory circuit 16—17 are forced by the alternate discharge of the condensers 14 and 15 therethrough, this circuit will oscillate at the vibratory frequency of the vibrator 20 even though its natural frequency may vary substantially therefrom. The oscillatory circuit, however, is tuned to a lower frequency than the inverter circuit comprising the inductor 18 and the condensers 14 and 15. The energy from the inverter circuit is thus supplied to the oscillatory circuit in short impulses occurring during the initial portion of each alternation of the oscillatory circuit in a manner which will be apparent from a consideration of Fig. 2 of the drawing which shows the current variations with respect to time. It will be understood that this figure is not intended to represent the variations in a quantitative sense but does represent the variations in a general qualitative manner. The oscillations of the oscillatory circuit 16—17 are indicated by the curve $I_o$, and the oscillations of the inverter circuit 14—15—18 are indicated by the curves $I_i$.

The damping load in the oscillatory circuit 16—17 is low, so that the circulating power is high relative to the load. The circuit thus provides a system in which the alternating current output is stabilized over a wide range of direct current input voltages.

It will be understood that the inverter is primarily intended to supply a resistance load, since a load having an inductive or capacitive impedance will reflect this impedance into the oscillatory circuit of the inverter, and thus change the output voltage to which the circuit is calibrated.

Preferably, the output frequency as determined by the frequency of the vibrator 20 will be as high as heat losses in the saturated component will allow, since with increasing frequency the size of the inductors and capacitors may be decreased.

While there has been herein described a preferred embodiment of the invention, other embodiments within the scope of the appended claims will be obvious to those skilled in the art from a consideration of the form shown and the teachings hereof. Accordingly a broad interpretation of the appended claims commensurate with the scope of the invention within the art is desired.

What is claimed is:

1. An inverter comprising a source of voltage, a first condenser connected across said source of voltage, an oscillatory circuit comprising a second condenser and a saturable inductor, a discharge circuit for discharging said first condenser through said oscillatory circuit, a controlled ignition discharge tube in said discharge circuit for causing said first condenser to discharge, a linear inductor in said discharge circuit, means for timing the ignition of said discharge tube to control the discharge of said first condenser through said discharge circuit, and means to derive an alternating output current from said oscillatory circuit.

2. An inverter comprising a source of voltage, a first condenser connected across said source of voltage, an oscillatory circuit comprising a second condenser and a saturable inductor, a discharge circuit tuned to a higher frequency than said oscillatory circuit for discharging said first condenser through said oscillatory circuit, a controlled ignition discharge tube in said discharge circuit for causing said first condenser to discharge, a linear inductor in said discharge circuit means for timing the ignition of said discharge tube to control the discharge of said first condenser through said discharge circuit, and means to derive an alternating output current from said oscillatory circuit.

3. An inverter comprising a source of voltage, a first condenser connected across said source of voltage, an oscillatory circuit comprising a second condenser and a saturable inductor, a discharge circuit for discharging said first condenser through said oscillatory circuit, a space discharge tube in said discharge circuit for causing said first condenser to discharge, a linear inductor in said discharge circuit, means for timing the discharge of said tube to control the discharge of said first condenser through said discharge circuit, and means to derive an alternating output current from said oscillatory circuit.

4. An inverter comprising a source of voltage, a first condenser connected across said source of voltage, an oscillatory circuit comprising a second condenser and a saturable inductor, a discharge circuit for discharging said first condenser through said oscillatory circuit, a space discharge tube in said discharge circuit for causing said first condenser to discharge, a linear inductor in said discharge circuit, a vibrator for timing the discharge of said tube to control the discharge of said first condenser through said discharge circuit, and means to derive an alternating output current from said oscillatory circuit.

5. An inverter comprising a source of voltage, a first condenser connected across said source of voltage, an oscillatory circuit comprising a condenser and a saturable inductor, a discharge circuit for discharging said first condenser through said oscillatory circuit, said discharge circuit being tuned to a higher frequency than the frequency at which said oscillatory circuit oscillates, a linear inductor in said discharge circuit, a space discharge tube in said discharge circuit, a vibrator for timing the discharge of said tube to control the discharge of said first condenser through said discharge circuit, and means to derive an alternating output current from said oscillatory circuit.

6. An inverter comprising a source of voltage, a pair of condensers in series connected across said source of voltage, an oscillatory circuit comprising a condenser and a saturable inductor, discharge circuits for alternately discharging said pair of condensers through said oscillatory circuit, a controlled ignition discharge tube in each of said discharge circuits for causing said pair of condensers to discharge, a linear inductor common to both of said discharge circuits, means for timing the ignition of said discharge tubes to control the discharge of said pair of condensers through said discharge circuits, and means to derive an alternating output current from said oscillatory circuit.

7. An inverter comprising a source of voltage, a pair of condensers in series connected across said source of voltage, an oscillatory circuit comprising a condenser and a saturable inductor, discharge circuits tuned to a higher frequency than said oscillatory circuits for alternately discharging said pair of condensers through said oscillatory circuit, a controlled ignition discharge tube in each of said discharge circuits for causing said pair of condensers to discharge, a linear inductor common to both of said discharge circuits, means for timing the ignition of said discharge tubes to control the discharge of said pair of condensers through said discharge circuits, and means to derive an alternating output current from said oscillatory circuit.

8. An inverter comprising a source of voltage, a pair of condensers in series connected across said source of voltage, an oscillatory circuit comprising a condenser and a saturable inductor, discharge circuits for alternately discharging said pair of condensers through said oscillatory circuit, a linear inductor common to both of said discharge circuits, a pair of space discharge tubes one in each of said discharge circuits, means for timing the discharge of said tubes to control the discharge of said pair of condensers through said discharge circuits, and means to derive an alternating output current from said oscillatory circuit.

9. An inverter comprising a source of voltage, a pair of condensers in series connected across said source of voltage, an oscillatory circuit comprising a condenser and a saturable inductor, discharge circuits for alternately discharging said pair of condensers through said oscillatory circuit, a linear inductor common to both of said discharge circuits, a pair of space discharge tubes one in each of said discharge circuits, a vibrator for timing the discharge of said discharge tubes to control the discharge of said pair of condensers through said discharge circuits, and means to derive an alternating output current from said oscillatory circuit.

10. An inverter comprising a source of voltage, a pair of condensers in series connected across said source of voltage, an oscillatory circuit comprising a condenser and a saturable inductor, discharge circuits for alternately discharging said pair of condensers through said oscillatory circuit, a linear inductor common to both of said discharge circuits, said discharge circuits being tuned to a frequency higher than the frequency at which said oscillatory circuit oscillates, a pair of space discharge tubes one in each of said discharge circuits, a vibrator for timing the discharge of said discharge tubes to control the discharge of said pair of condensers through said discharge circuits, and means to derive an alternating output current from said oscillatory circuit.

HANS KLEMPERER.

REFERENCES CITED

The following references are of record in the file of this patent:

UNITED STATES PATENTS

| Number | Name | Date |
| --- | --- | --- |
| 2,179,366 | Willis | Nov. 7, 1939 |
| 2,233,416 | Klemperer | Mar. 4, 1941 |